(12) United States Patent
Kim (10) Patent No.: US 9,170,115 B2
(45) Date of Patent: Oct. 27, 2015

(54) METHOD AND SYSTEM FOR GENERATING ROAD MAP USING DATA OF POSITION SENSOR OF VEHICLE

(71) Applicant: Hyundai Motor Company, Seoul (KR)

(72) Inventor: Min Suk Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 95 days.

(21) Appl. No.: 14/081,147

(22) Filed: Nov. 15, 2013

(65) Prior Publication Data

US 2014/0358436 A1 Dec. 4, 2014

(30) Foreign Application Priority Data

Jun. 3, 2013 (KR) ........................ 10-2013-0063707

(51) Int. Cl.
*G01C 21/32* (2006.01)
*B60W 30/12* (2006.01)

(52) U.S. Cl.
CPC .............. *G01C 21/32* (2013.01); *B60W 30/12* (2013.01)

(58) Field of Classification Search
CPC ............................. G01C 21/32; B60W 30/12

USPC .......................... 701/470, 532, 408, 409, 410
See application file for complete search history.

(56) References Cited

U.S. PATENT DOCUMENTS 6,526,352 B1 * 2/2003 Breed et al. ................... 701/470
8,564,657 B2 * 10/2013 Michalke et al. ............. 348/118

FOREIGN PATENT DOCUMENTS

| JP | 2008267875 A | 11/2008 |
| KR | 10-2011-0046211 | 5/2011 |
| KR | 10-2011-0087664 | 8/2011 |

* cited by examiner

*Primary Examiner* — Richard Camby
(74) *Attorney, Agent, or Firm* — Mintz Levin Cohn Ferris Glovsky and Popeo, P.C.

(57) ABSTRACT

A method and a system for generating a map using data of a position sensor of a vehicle are provided which are used to generate a map by collecting data of a position sensor disposed within a vehicle. The method includes collecting, by a controller, data from the position sensor disposed within the vehicle to sense the position of the vehicle and analyzing the collected data of the position sensor. In addition, the method includes automatically generating, by the controller, the map using the analyzed data.

11 Claims, 8 Drawing Sheets

METHOD AND SYSTEM FOR GENERATING ROAD MAP USING DATA OF POSITION SENSOR OF VEHICLE

CROSS-REFERENCE TO RELATED APPLICATION

This application claims priority to and the benefit of Korean Patent Application No. 10-2013-0063707 filed in the Korean Intellectual Property Office on Jun. 3, 2013, the entire contents of which are incorporated herein by reference.

BACKGROUND (a) Field of the Invention

The present invention relates to a method and a system for generating a map using data of a position sensor of a vehicle to generate a map by collecting data of a position sensor in a vehicle.

(b) Description of the Related Art

As well known in the art, recent vehicles are increasingly equipped with an ADAS (Advanced Driver Assistance System) that recognizes and prevents in advance a danger of an accident or provides more convenient driving for the driver. Examples of an ADAS include an LDWS (Lane Departure Warning System), an LKAS (Lane Keeping Assist System), an BSD (Blind Spot Detection), and an ACC (Adaptive Cruise Control System) etc.

A map of roads is needed to appropriately operate the ADAS a map should be generated and/or implemented first for the map to be used with the ADAS (hereinafter, referred to as "ADAS MAP"). In the related art, surveying companies construct an ADAS MAP (e.g., road radius of curvature and slope etc.) in a semiautomatic type by surveying individual roads, using survey equipment and surveying vehicles, to make or implement the ADAS MAP. The generation of this map is substantially expensive and requires days to update the data. On the other hand, vehicles are equipped with sensors that locate vehicles. For example, position sensors may include a GPS (Global Position System) sensor and a gyro sensor. However, the position sensors are used for locating vehicles and are not capable of providing data for generating the ADAS MAP.

The above information disclosed in this section is only for enhancement of understanding of the background of the invention and therefore it may contain information that does not form the prior art that is already known in this country to a person of ordinary skill in the art.

SUMMARY

The present invention provides a method and a system of generating an ADAS MAP using data of a position sensor by collecting data of a position sensor in a vehicle.

An exemplary embodiment of the present invention provides a method of generating a map using data of a position sensor of a vehicle, which may include: collecting data from a position sensor disposed within a vehicle to sense the position of the vehicle; analyzing the collected data of the position sensor; and automatically generating a map, using the analyzed data. The position sensor may include a GPS sensor and a gyro sensor.

The analyzing of data of the position sensor may be performed by a data analysis/map generation controller connected to a telematics center (e.g., TMS center; Telematics Multimedia System Center), and the data of the position sensor may be transmitted to the telematics center via a telematics terminal within the vehicle. In particular, the data analysis/map generation controller may be configured to automatically generate an ADAS (Advanced Driver Assistance System) map by processing the data of the position sensor in parallel.

The data analysis/map generation controller may be configured to perform: dividing data for each area from data of the GPS sensor and then segmenting the data for each road; statistically calculating three-dimensional (3D) coordinates and road slope at each of predetermined distances with reference to a road center line by map-matching the data of the position sensor divided for each road link with the road links; dividing the linear curve and straight sections using a statistic method with reference to the vertical cross-section and plane of the roads; calculating a radius of curvature, using the method of least squares, as each measured value by applying a road linear design method to calculate the radius of curvature of the vertical cross-section and lane curve sections; and storing the property values of the map by dividing the 3D coordinates and curvature start points, end points, and the radii of curvature for the plane and the cross-section with respect to the road center line for each road link.

Another exemplary embodiment of the present invention provides a system for generating a map using data of a position sensor of a vehicle, which may include: a position sensor disposed within a vehicle and configured to sense the position of the vehicle; a TMS terminal configured to collect and transmit data from the position sensor to a telematics center; a telematics center configured to receive the data of the position sensor transmitted from the TMS terminal; and a data analysis/map generation controller connected to the telematics center, configured to analyze the collected data of the position sensor, and automatically generate a map based on the analyzed data, in which the data analysis/map generation controller may be operated by a program composed of a series of commands for performing a method of generating a map using data of a position sensor of a vehicle which may include: collecting data from a position sensor disposed within a vehicle to sense the position of the sensor; analyzing the collected data of the position sensor; and automatically generating a map, using the analyzed data.

As described above, according to an exemplary embodiment of the present invention, since it may be possible to generate an ADAS MAP by collecting data (e.g., information) of various position sensors within a vehicle, it may be possible to reduce the cost for constructing an ADAS MAP and to update the map almost in real time. In other words, according to an exemplary embodiment of the present invention, since a vehicle equipped with a TMS terminal may continuously transmit data of a position sensor and it may be possible to automatically construct a 3D ADAS MAP of roads using the data, it may be possible to reduce the cost for constructing a map to survey the actual field of the related art. Further, according to an exemplary embodiment of the present invention, by receiving data of a position sensor in real time from a vehicle on a road and by automatically generating and construction data relating to a map, it may be possible to improve the rapidness of updating data in the ADAS MAP that is used for controlling of a vehicle and alarming.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, the present invention will be described more fully hereinafter with reference to the accompanying drawings, in which exemplary embodiments of the invention are shown. However, the present invention is not limited to the exemplary embodiments described herein and may be embodied in other ways.

Figure 1:
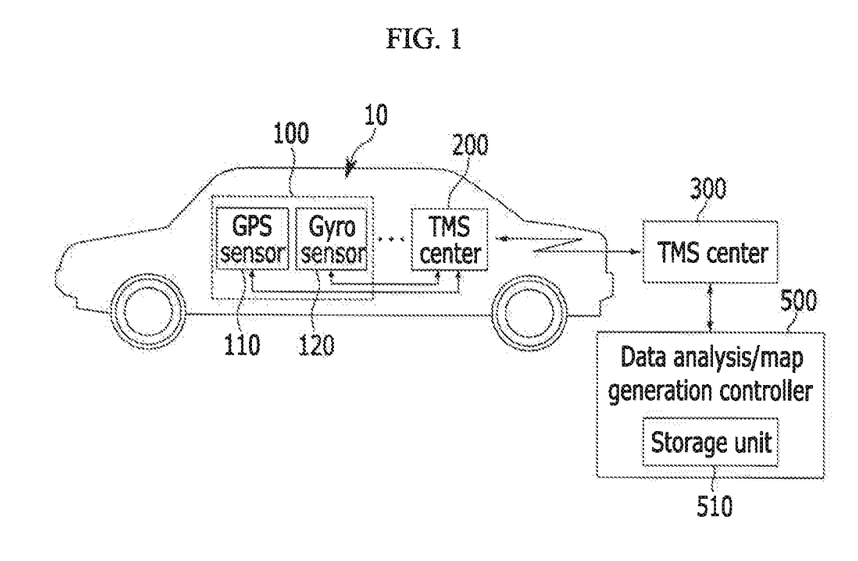
FIG. 1 is an exemplary diagram of a system for generating a map using data of a position sensor within a vehicle according to an exemplary embodiment of the present invention.

FIG. 1 is an exemplary block diagram of a system for generating a map using data of a position sensor within a vehicle according to an exemplary embodiment of the present invention. A system for generating a map using data of a position sensor disposed within a vehicle may be a system that generates a map by collecting data (e.g., information) of various position sensors (e.g., GPS sensor and gyro sensor) disposed within a vehicle.

In particular, the system that generates a map using data of a position sensor may include: a position sensor 100 disposed within a vehicle 10 to sense the position of the vehicle; a TMS (Telematics) terminal 200 that collects and transmits data of the position sensor 100 to a TMS (Telematics) center 300; the TMS center 300 may receive the data of the position sensor transmitted from the TMS terminal 200; and a data analysis/map generation controller 500 connected to the TMS center 300, may be configured to analyze the collected data of the position sensor 100, and automatically generate a map based on the analyzed data.

The position sensor 100 may include a GPS sensor 110 and a gyro sensor 120. Although the position sensor 100 may include a GPS sensor and a gyro sensor in an exemplary embodiment of the present invention, it should be understood that the present invention is not limited thereto. Other than the GPS sensor and the gyro sensor, the scope of the present invention may be used for any sensor that may detect information (e.g., data) about the position of the vehicle. In addition, the TMS terminal 200 and the TMS center 300 may be equivalent to TMS terminals and TMS centers in the related art.

The data analysis/map generation controller 500 may be connected via a wire or wirelessly to the TMS center 300. The data analysis/map generation controller 500 may include one or more microprocessors operated by set programs or hardware including the microprocessor and the programs may be constructed by a series of commands for performing the method of generating a map using data of a position sensor of a vehicle. Further, the data analysis/map generation controller 500 may be included in the TMS center 300. The data analysis/map generation controller 500 may include an ADAS MAP generation system of the related art that automatically generates a 3D ADAS MAP based on predetermined position data.

Hereinafter, a method of generating a map using data of a position sensor of a vehicle according to an exemplary embodiment of the present invention is described in detail with reference to the accompanying drawings.

Figure 2:
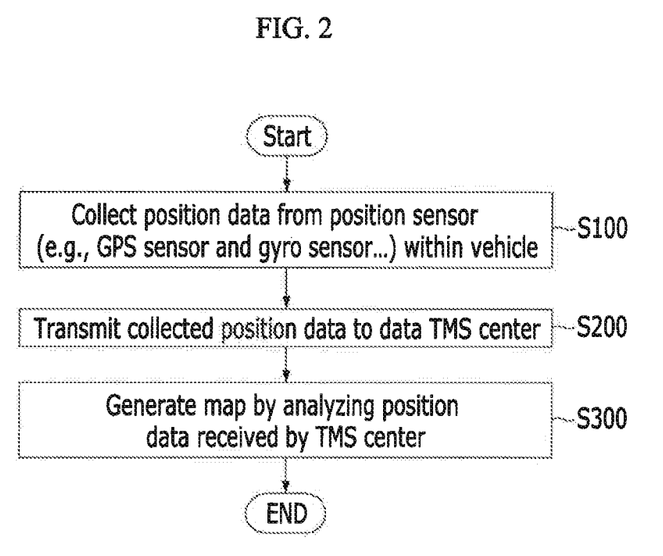
FIG. 2 is an exemplary flowchart of a method of generating a map using data of a position sensor within a vehicle according to an exemplary embodiment of the present invention.

FIG. 2 is an exemplary flowchart illustrating a method of generating a map using data of a position sensor within a vehicle according to an exemplary embodiment of the present invention.

A GPS sensor 110, a position sensor disposed within a vehicle, may be configured to detect and transmit the current 3D GPS information of the vehicle to the TMS terminal 200 and a gyro sensor 120 may be configured to detect and transmit 3D gyro information and the slope of a road to the TMS terminal 200. For this configuration, the data analysis/map generation controller 500 may be configured to operate the TMS terminal 200 via the TMS center 300. In other words, the TMS terminal 200 may be configured to collect the data from the GPS sensor 110 and the gyro sensor 120 at a predetermined period under the operation of the data analysis/map generation controller 500.

The data detected by the GPS sensor 110 and the gyro sensor 120 may be a substantial amount data. When the data detected by the GPS sensor 110 and the gyro sensor 120 is collected in the TMS terminal 200, the TMS terminal 200 may be configured to transmit the collected data to the TMS center 300 at a predetermined period or when a specific event occurs. When the data of the position sensor 100 collected in the TMS terminal 200 is transmitted to the TMS center 300, the TMS center 300 may be configured to transmit the received data of the position sensor 100 to the data analysis/map generation controller 500.

When transmitting the data of the position sensor 100 to the data analysis/map generation controller 500, the TMS center 300 may be operated by the data analysis/map generation controller 500. When the data analysis/map generation controller 500 receives the data of the position sensor 100 via the TMS center 300, the data analysis/map generation controller 500 may be configured to automatically generate a 3D ADAS MAP by processing and analyzing the received big data of the position sensor 100 in parallel (S300). The technology of the data analysis/map generation controller 500 automatically generating a 3D ADAS MAP by analyzing the data may be the technology of automatically generating an ADAS MAP of the related art, but it should be understood that the present invention is not limited thereto.

Figure 3:
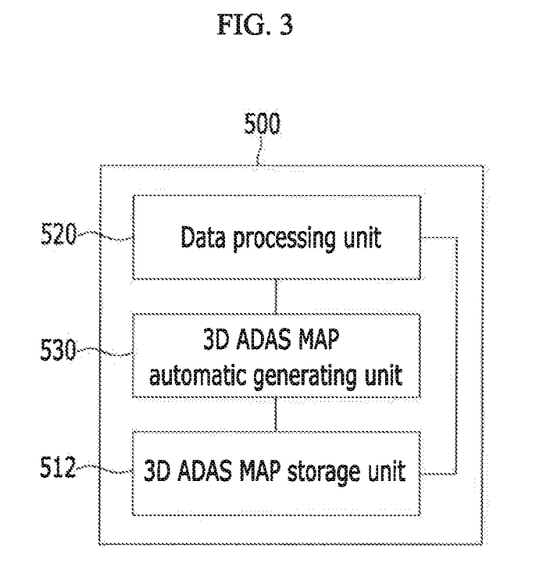
FIG. 3 is an exemplary detailed block diagram of a data analysis/map generation controller according to an exemplary embodiment of the present invention.

In other words, the data analysis/map generation controller 500 according to an exemplary embodiment of the present invention may be configured to automatically generate 3D ADAS MAP by: dividing the data of the position sensor 100 for each area and segmenting the data for each road, by statistically calculating 3D coordinates and road slope at each of a plurality of predetermined distances with reference to a road center line by map-matching the data of the position sensor 100 divided for each road link with the road links, by dividing the linear curve and straight sections using a statistic method with reference to the vertical cross-section and plane of the roads, by calculating a radius of curvature to create minimum error from the data of the position sensor 100, using the method of least squares, as each measured value by applying a road linear design method to calculate the radius of curvature of the vertical cross-section and lane curve sections, and by storing the property values of the map by dividing the 3D coordinates and curvature start points, end points, and the radii of curvature for the plane and the cross-section with respect to the road center line for each road link. For this configuration, the data analysis/map generation controller 500 according to an exemplary embodiment of the present invention, as shown in FIG. 3, may include a data processor 520, a 3D ADAS MAP automatic generating unit 530 (executed by the controller), and a 3D ADAS MAP storage unit 512 (e.g., memory).

Figure 4:
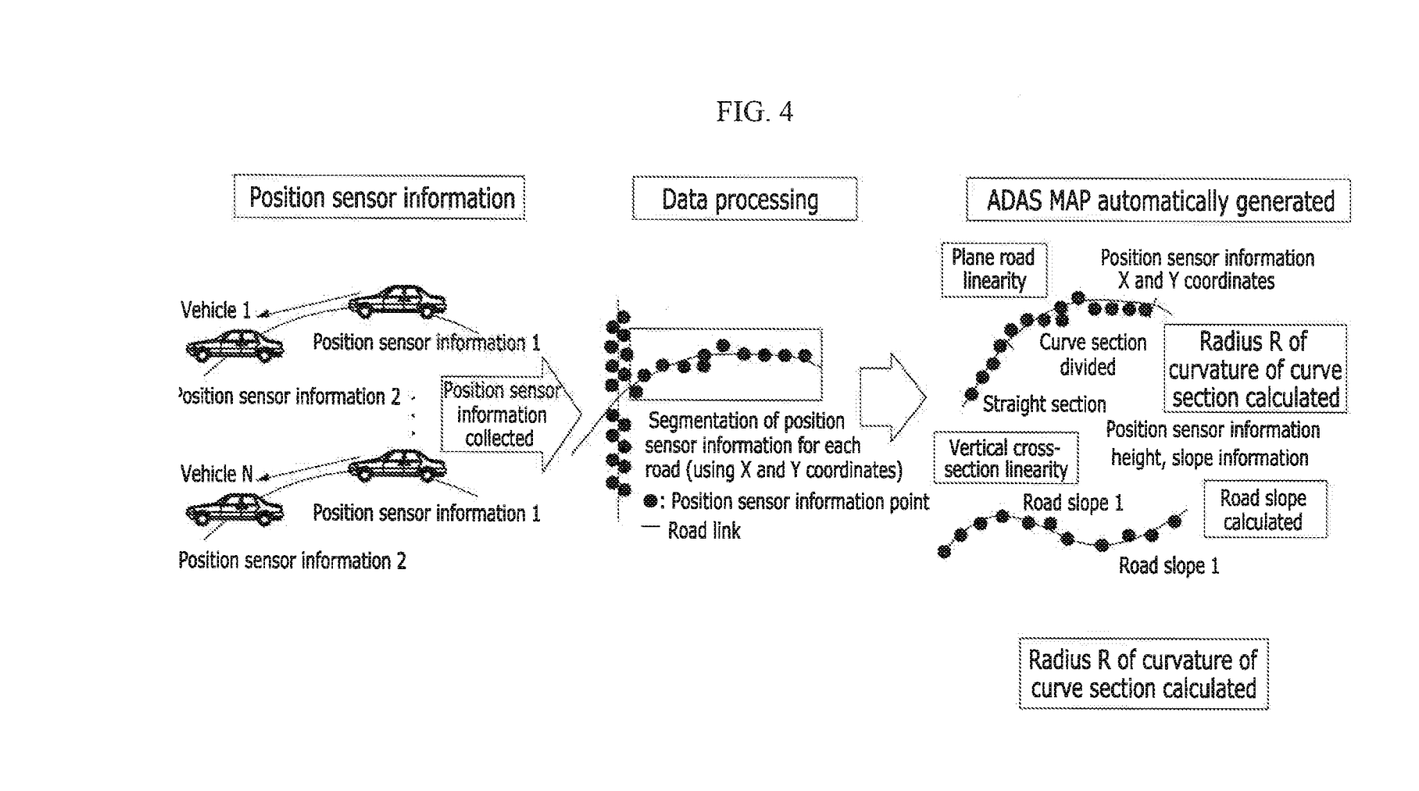
FIGS. 4 to 8 are exemplary views illustrating the operation of a system and a method of generating a map using data of a position sensor within a vehicle according to an exemplary embodiment of the present invention.

The operation process of an exemplary embodiment of the present invention is shown in FIG. 4. The data processor 520 of the data analysis/map generation controller 500 may be configured to extract the information (e.g., data) in the position sensor 100 from raw data, which is vehicle information collected from several vehicle, and segments the data for each road link. The data processor 520 may improve the speed of processing data-like unstructured data and processes a substantial amount of data in parallel for real-time processing.

An example of the data processor 520 processing a substantial amount of data in parallel may be provided as follows. The order of the processing of a substantial amount of data in parallel by the data processor 520 may follow the order shown in FIG. 5.

Figure 5:
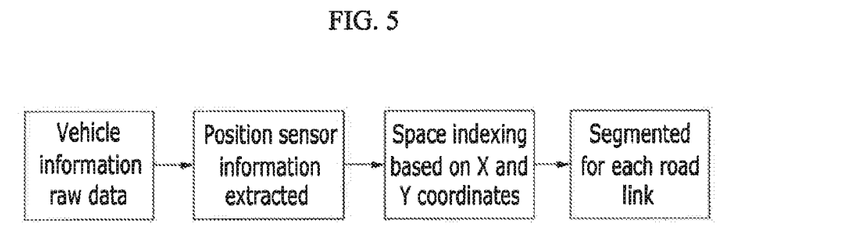

Referring to FIG. 5, the data processor 520 may be configured to extract information of the position sensor from the raw data of a vehicle, perform X and Y coordinate-based space indexing, and segment the information for each road link. The data processor 520 may be configured to perform data parsing, data cleansing, geo-coding, space indexing, road link map matching, and data storing, for processing a substantial amount of data in parallel.

Therefore, it may be possible to extract the information of the position sensor disposed within a vehicle from unstructured data having various formats (e.g., text and binary) using the data parsing. It may also be possible to check compatibility of data and remove repeated data using the data cleansing. Further, it may be possible to convert the position sensor information of a vehicle into spatial data, using X and Y coordinates in the information of the position sensor using the geo-coding. The space indexing may be performed to divisionally process data for each grid in parallel. Data segmentation may be performed for each road link using map-matching between position sensor data and road links in grids in the road link map-matching. The position sensor data, space indexing information, and link information may be stored in the 3D ADAS MAP storage unit 512.

Further, the 3D ADAS MAP automatic generating unit 530 may be executed by the controller to automatically extract the curve section, the radius of curvature, and slope information of roads in the ADAS MAP data from the position sensor information divided for each road link. The operational status of the 3D ADAS MAP automatic generating unit 530 that performs the operation described above is shown in FIGS. 6 to 8.

Figure 6:
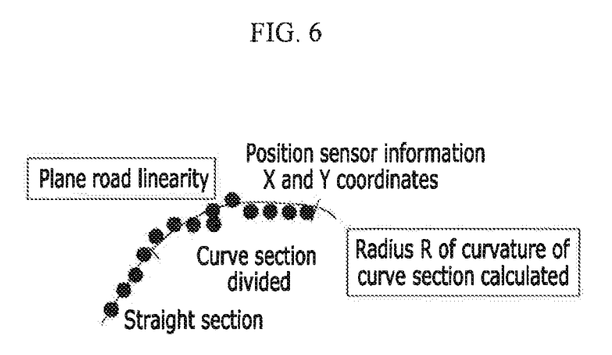
Figure 7:
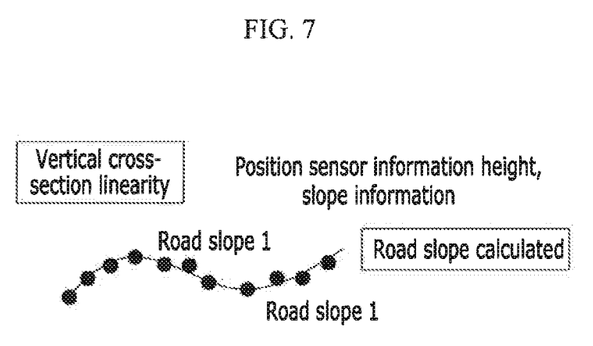
Figure 8:
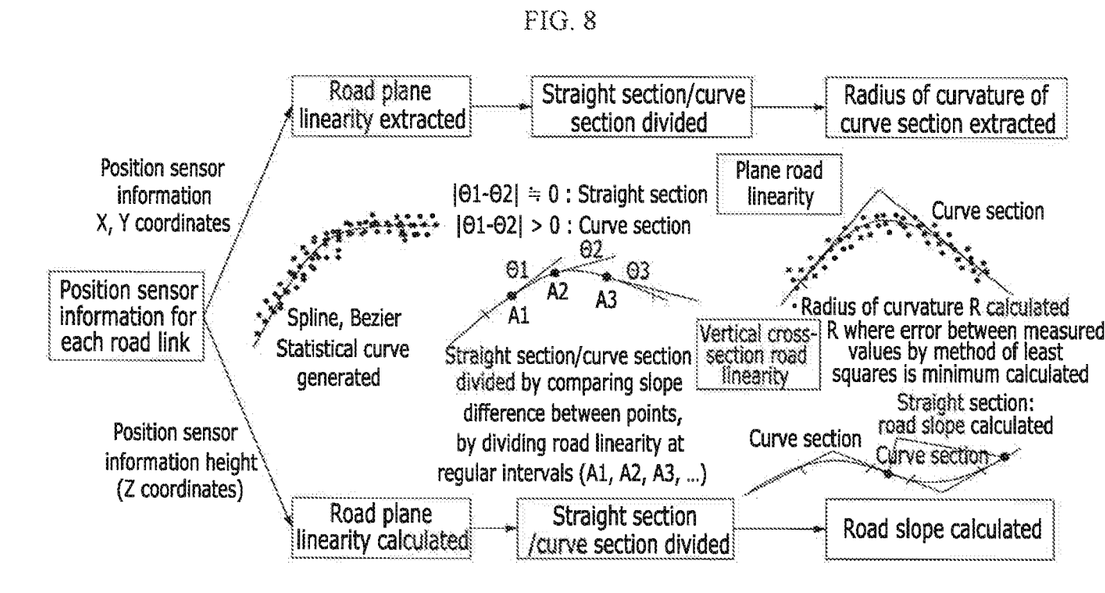

Referring to FIGS. 6 to 8, the 3D ADAS MAP automatic generating unit 530 may be configured to generate Spline, Bezier statistic curves for road plane/vertical cross-section linear extraction, divide straight section/curve section by dividing the road linearity (A1, A2, A3, . . . ) with regular intervals in association with division of straight section/curve section and comparing differences in inclination between points, and may be configured to calculate curvature where the error between the measured values may be minimal, using the method of least squares in relation to calculation of radius of curvature. Therefore, according to an exemplary embodiment of the present invention, it may be possible to generate an ADAS MAP by collecting data (e.g., information) of a position sensor disposed within a vehicle.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

| Description of symbols | |
|---|---|
| 10: Vehicle | 100: Position sensor |
| 110: GPS sensor | 120: Gyro sensor |
| 200: TMS terminal | 300: TMS center |
| 500: data analysis/map generation controller | |

What is claimed is:

1. A method of generating a map using data of a position sensor of a vehicle, the method comprising:
    collecting, by a controller, data from the position sensor disposed within the vehicle to sense the position of the vehicle;
    analyzing, by the controller, the collected data of the position sensor;
    automatically generating, by the controller, an Advanced Driver Assistance System (ADAS) map by processing the data of the position sensor in parallel;
    dividing, by the controller, data for each area from data of the GPS sensor and segmenting the data for each road;
    statistically calculating, by the controller, three-dimensional (3D) coordinates and road slope at each of a plurality of predetermined distances with reference to a road center line by map-matching the data of the position sensor divided for each road link with the road links;

dividing, by the controller, the linear curve and straight sections using a statistic method with reference to the vertical cross-section and plane of the roads;

calculating, by the controller, a radius of curvature, using the method of least squares, as each measured value by applying a road linear design method to calculate the radius of curvature of the vertical cross-section and lane curve sections; and storing, by the controller, the property values of the map by dividing the 3D coordinates and curvature start points, end points, and the radii of curvature for the plane and the cross-section with respect to the road center line for each road link.

2. The method of claim 1, wherein the position sensor includes a global positioning system (GPS) sensor and a gyro sensor.

3. The method of claim 1, wherein the controller is connected to a telematics center (TMS center; Telematics Multimedia System Center), and the data of the position sensor is transmitted to the telematics center via a telematics terminal within the vehicle.

4. The method of claim 3, further comprising:

automatically generating, by the controller, an Advanced Driver Assistance System (ADAS) map by processing the data of the position sensor in parallel.

5. A system for generating a map of a vehicle, the system comprising:

a position sensor disposed within the vehicle to sense the position of the vehicle;

a Telematics Mulimedia System (TMS) terminal configured to collect and transmit data of the position sensor to a telematics center; and a controller connected to the telematics center, configured to:

collect data from the position sensor disposed within the vehicle;

analyze the collected data of the position sensor; and automatically generate the map based on the analyzed data, wherein the controller is further configured to:

divide data for each area from data of the GPS sensor and segment the data for each road;

statistically calculate three-dimensional (3D) coordinates and road slope at each of predetermined distances with reference to a road center line by map-matching the data of the position sensor divided for each road link with the road links;

divide the linear curve and straight sections using a statistic method with reference to the vertical cross-section and plane of the roads;

calculate a radius of curvature, using the method of least squares, as each measured value by applying a road linear design method to calculate the radius of curvature of the vertical cross-section and lane curve sections; and store the property values of the map by dividing the 3D coordinates and curvature start points, end points, and the radii of curvature for the plane and the cross-section with respect to the road center line for each road link.

6. The system of claim 5, wherein the position sensor includes a GPS sensor and a gyro sensor.

7. The system of claim 5, wherein the the data of the position sensor is transmitted to the telematics center via a telematics terminal within the vehicle.

8. The system of claim 7, wherein the controller is configured to automatically generate an ADAS (Advanced Driver Assistance System) map by processing the data of the position sensor in parallel.

9. A non-transitory computer readable medium containing program instructions executed by a controller, the computer readable medium comprising:

program instructions that collect data from the position sensor disposed within the vehicle to sense the position of the vehicle;

program instructions that analyze the collected data of the position sensor;

program instructions that automatically generate the map, using the analyzed data;

program instructions that divide data for each area from data of the GPS sensor and segmenting the data for each road;

program instructions that statistically calculate three-dimensional (3D) coordinates and road slope at each of a plurality of predetermined distances with reference to a road center line by map-matching the data of the position sensor divided for each road link with the road links;

program instructions that divide the linear curve and straight sections using a statistic method with reference to the vertical cross-section and plane of the roads;

program instructions that calculate a radius of curvature, using the method of least squares, as each measured value by applying a road linear design method to calculate the radius of curvature of the vertical cross-section and lane curve sections; and program instructions that store the property values of the map by dividing the 3D coordinates and curvature start points, end points, and the radii of curvature for the plane and the cross-section with respect to the road center line for each road link.

10. The non-transitory computer readable medium of claim 9, wherein the position sensor includes a global positioning system (GPS) sensor and a gyro sensor.

11. The non-transitory computer readable medium of claim 10, further comprising:

program instructions that automatically generate an Advanced Driver Assistance System (ADAS) map by processing the data of the position sensor in parallel.

\* \* \* \* \*